US00RE38171E

(19) United States
(12) Reissued Patent
Bocquet

(10) Patent Number: US RE38,171 E
(45) Date of Reissued Patent: Jul. 1, 2003

(54) INTRODUCTION SEQUENCER FOR NETWORK STRUCTURE MICROPROCESSOR

(75) Inventor: Christian Bocquet, Aix-en-Provence (FR)

(73) Assignee: STMicroelectronics S.A. (FR)

( * ) Notice: This patent issued on a continued prosecution application filed under 37 CFR 1.53(d), and is subject to the twenty year patent term provisions of 35 U.S.C. 154(a)(2).

(21) Appl. No.: 08/954,438

(22) PCT Filed: Sep. 10, 1986

(86) PCT No.: PCT/FR86/00302

§ 371 (c)(1),
(2), (4) Date: Apr. 30, 1987

(87) PCT Pub. No.: WO87/01838

PCT Pub. Date: Mar. 26, 1987

Related U.S. Patent Documents

Reissue of:
(64) Patent No.: 4,878,195
Issued: Oct. 31, 1989
Appl. No.: 07/051,144
Filed: Apr. 30, 1987

U.S. Applications:
(63) Continuation of application No. 08/714,518, filed on Sep. 16, 1996, now abandoned, which is a continuation of application No. 08/359,005, filed on Dec. 19, 1994, now abandoned, which is a continuation of application No. 07/785,790, filed on Oct. 31, 1991, now abandoned.

(30) Foreign Application Priority Data

Sep. 13, 1985 (FR) ..... 85 13634

(51) Int. Cl.[7] ..... G06F 9/22
(52) U.S. Cl. ..... 712/208; 326/105; 326/39; 365/222
(58) Field of Search ..... 326/39, 105; 712/208; 365/222

(56) References Cited

U.S. PATENT DOCUMENTS 4,546,273 A * 10/1985 Osmar ..... 307/463
4,583,012 A * 4/1986 Smith et al. ..... 364/716
4,617,649 A * 10/1986 Kyomasu et al. ..... 307/465
4,631,424 A * 12/1986 Miyagi ..... 307/448
4,652,992 A * 3/1987 Menschi ..... 307/463
4,675,556 A * 6/1987 Bazes ..... 307/465
4,752,901 A * 6/1988 Vaughn ..... 307/448
4,777,390 A * 10/1988 Hoshi ..... 307/463

OTHER PUBLICATIONS

IBM Technical Disclosure, "Intelligent Alu", vol. 25, No. 12, p. 6510, May 1983.*

* cited by examiner

*Primary Examiner*—David Y. Eng
(74) *Attorney, Agent, or Firm*—Lisa K. Jorgenson; Peter J. Thoma

(57) ABSTRACT

The invention concerns an instructions sequencer for microprocessor wherein the sequencer presents an architecture, a circuit conception and a presents that improves the compacity and facilitates conception and adaptation operations to different instructions sets, the sequencer having a line and column architecture and very widely produced in the form of a transistor and capacitor matrix, functioning with decoding transistors, preload transistors and a matrix for defining the phases of operating cycles.

1 Claim, 2 Drawing Sheets

INTRODUCTION SEQUENCER FOR NETWORK STRUCTURE MICROPROCESSOR

Matter enclosed in heavy brackets [ ] appears in the original patent but forms no part of this reissue specification; matter printed in italics indicates the additions made by reissue.

*This application is a Continuation of U.S. patent application Ser. No. 08/714,518, filed Sep. 16, 1996, abandoned, which is a Continuation of U.S. patent application Ser. No. 08/359,005, filed Dec. 19, 1994, abandoned, which is a Continuation of U.S. patent application Ser. No. 07/785,790, filed Oct. 31, 1991, abandoned, which is a Reissue Application of U.S. patent application Ser. No. 07/051,144, U.S. Pat. No. 4,878,195, issued Oct. 31, 1989.*

FIELD OF THE INVENTION

Background of the Invention

The present invention concerns complex integrated circuits, and more particularly microprocessors, that are circuits capable of carrying out not only a single, well-defined function, but also a variety of different functions. Instructions, received at the input of the microprocessor in the form of coded signals, determine the functions to be carried out. The succession of the instructions received determines the sequence of a complex numerical processing performed by the microprocessor on data also received at the input of the microprocessor.

The microprocessors are circuits of which the complexity is such that their conception requires years of work for the teams that are responsible for this conception.

Not only it is long and difficult to conceive schemas of electric circuits allowing to carry out all the functions desired but furthermore it is necessary to provide that these schemas can be integrated on a silicon chip having reasonably small dimensions, i.e. compatible with sufficient manufacturing yields.

From this necessity results a very large topological implantation or "lay-out", allowing to place in position the different circuit elements within a surface as small as possible. Often, this lay-out work leads to restructuring the electric schemas themselves so that the conception work of the circuit itself and the lay-out work become closely linked.

Furthermore, a microprocessor comprises circuits of which the electrical functions are overall the same for the different microprocessors; accumulators, various registers, instruction decoders, digital and logic unity; possible read-only memories (ROM) and random-access memories (RAM) when they are integrated on the same chip as the microprocessor per se.

When a conception team has worked over a long period on a microprocessor, it wishes to be able to reuse in their definite form, without modifying them or only slightly modifying them, certain parts of the microprocessor which would well be adapted to another microprocessor of the same type. The reutilization allows considerable savings on conception costs, increasingly so since parts whose working has been checked on effectively manufactured microprocessors will be reused; the reutilization without notable modification guarantees correct functioning without requiring new tests for the important units of the new microprocessor.

In order to allow more simply such reutilization of circuit parts having already proved their aptitude at correct functioning, it is desirable to provide that the general structure of the circuit can be adapted to this reutilization; it must be adapted both with respect to the electrical functionality and with respect to the lay-out: it two different clearly distinct functions are toplogically imbricated within each other, it will be practically impossible to decide to profitably reutilize one of the functions without the other. Furthermore, the fact that the groups of circuit elements appear to form topologically units clearly distinct from one another is not a reason for considering that these units can be profitably reutilized if the separation of the functions is not as definite as the topological separation of the units.

The invention concerns more particularly the part of the microprocessor that is called the "instruction sequencer" and of which the function is the following: it receives binary signals representing the instructions to be carried out, signals which are present in the form of several bits in parallel stored in an instruction register; upon a determined instruction, corresponding to a group of well defined bits, the sequencer causes to correspond one or several control signals appearing respectively on the output control lines of the sequencer. These control lines are connected to logic gates or registers or other circuit elements; an instruction actuates a certain number of control lines, in such a manner as to open the logic gates (for example) or load the registers, etc. . . while another instruction will open other gates or will load other registers.

Taking into account the complexity of the functions carried out by the microprocessor, each instruction generally activates several control lines and reciprocally a single control line can be activated by several instructions.

This means that the binary signal which appears on each control line must be a boolean function (sum of products) of the bits constituting the instructions.

The sequencer thus essentially comprises a decoder comprising multiplying AND gates giving the products followed by adding OR gates giving the sums. In a classical manner, it is furthermore possible without any drawback to replace these gates by NOR gates in cascade with other NOR gates.

Thus for decoding, a transistor matrix or network in lines and columns is first of all generally used for carrying out the NOR functions on the instructions bits; the bits and their complements arrive on the columns and each line establishes a NOR function of a particular association of the bits and of their complements; the programming of this NOR function is determined by the presence or absence of a transistor at the intersection of the line with the different columns.

It is well understood that this first decoding is insufficient since it only achieves associating a NOR gate output to a determined instruction. It is thus necessary to complete this decoding in order to associate between one another several outputs of this network in such a manner that certain control lines are common to several different instructions while reciprocally certain instructions each activate several control lines.

The known sequences widely use this first transistor matrix for carrying out the first part of the instructions decoding; the use of such a matrix is in fact advantageous with respect to space required and manufacturing facility.

But with respect to the rest of the decoding, the known sequencers use solutions that are not at all optimal from the point of view of space required, ease of manufacturing, and facility of reutilization in other microprocessors; one solution uses another complete network of transistors but then on the one hand this network is very space consuming, and on the other hand, the outputs of the second network are perpendicular to the outputs of the first network; another solution uses NOR, NAND, and other logic gates that carry out the boolean functions required but which are topologically disposed in a totally random manner; this solution uses a minimum of elements but consumes a great amount of space for the passage of the electrical connections to and from these gates. Furthermore, they are not adaptable to a modular structure where the logic units are placed side by side, one unit being able to be replaced by a slightly different unit if the conception of the microprocessor is modified.

The present invention proposes a sequencer structure that is distinguished from known sequencers by its architecture, its electrical schema and its lay-out, these three combined components allowing to achieve a sequencer which on the one hand occupies a particularly reduced semiconductive surface and which on the other hand is constituted by juxtapositioned units facilitating reutilization of certain parts during the conception of another microprocessor having similar characteristics.

The instructions sequencer for microprocessor according to the invention has the following constitution:

(a) its inputs are connected to input conductors extending along the length of the first parallel columns;

(b) each first column comprises a plurality of decoding transistors that are furthermore disposed in lines, a transistor placed at the intersection of a line and a column having its grid connected to the input conductor and its drain connected to a line conductor taken among a group of first line conductors that each correspond to a respective line;

(c) each first line conductor is connected to a first preload transistor corresponding to this line, transistor of which the grid is controlled by a first clock signal, the first preload transistors being placed along the length of a second column parallel to the first columns;

(d) each first line conductor is also connected to a first capacitor corresponding to this line, the first capacitors being placed along the length of a third column parallel to the first columns;

(e) each first line conductor is also connected to the source of a first sampling transistor corresponding to this line, transistor of which the grid is controlled by a second clock signal and of which the drain is connected to a line conductor taken from among a group of second line conductors corresponding each to a respective line, the first sampling transistors being placed along the length of a fourth column parallel to the others;

(f) the drain of each first sampling transistor is also connected to a second respective capacitor and the second capacitors are placed along the length of a fifth column parallel to the others;

(g) each second line conductor is connected to the grid of a transistor placed along the length of a sixth column, the drain of this transistor being connected to the input of a controlled gate, and the transistor sources of the sixth column all being connected at the same point;

(h) the controlled gates are placed along the length of a seventh column parallel to the others and they each have an output connected on the one hand to a third respective capacitor, on the other hand a respective second preload transistor and finally to the source of a second sampling transistor, the three capacitors being placed along the length of an eighth column parallel to the others, the second preload transistors being placed along the length of a ninth column parallel to the others and having their grid controlled by a third clock signal, the second sampling transistors being placed along the length of a tenth column and having their grid controlled by a fourth clock signal.

BRIEF DESCRIPTION OF THE DRAWINGS

The invention will become more apparent from the following detailed description given by way of non-limitative illustration and with reference to the appended drawings in which.

DETAILED DESCRIPTION OF A PREFERRED EMBODIMENT

Figure 1:
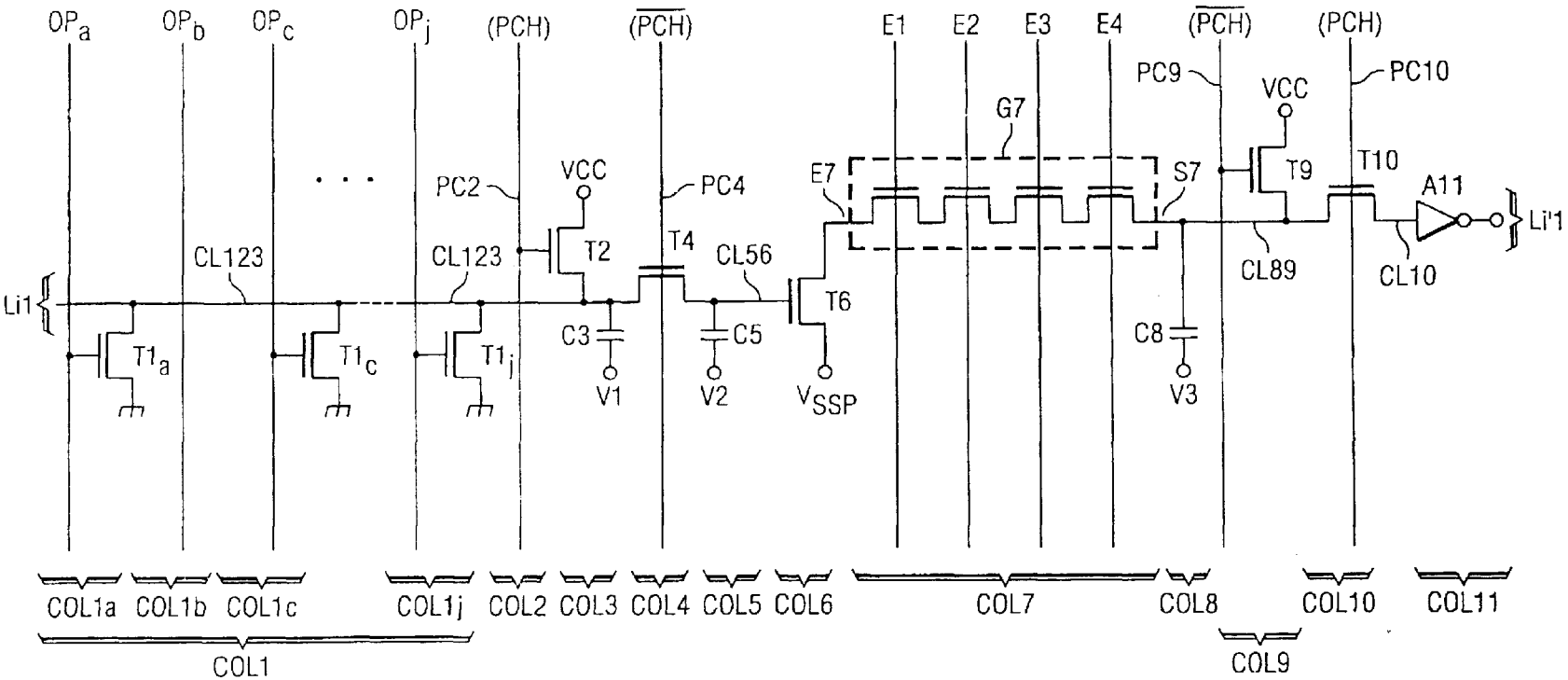
FIG. 1 represents a typical line of the sequencer structure according to this invention.
Figure 2:
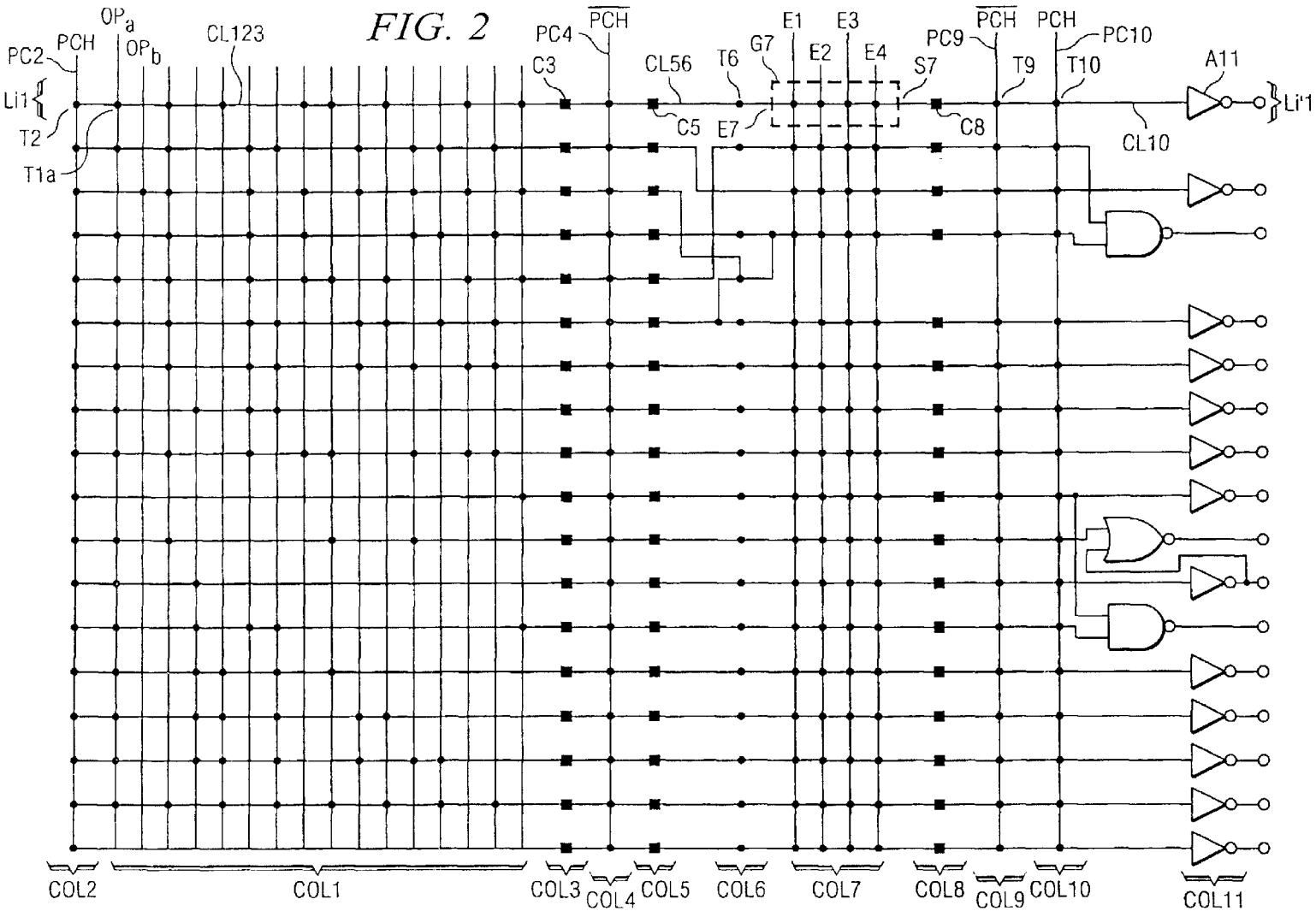
FIG. 2 represents a view of the whole, in symbolic form, of the topology of the sequencer.

In order to clearly illustrate the structure of the sequencer according to the invention on a relatively readable schema despite the complexity of the circuit, the description will be divided into two parts; firstly, a detailed description of the different circuit elements that are found by following essentially one line of the lines and columns structure of the sequencer; these elements are represented on FIG. 1; then, on FIG. 2, the topologic structure of the whole of the sequencer can be seen in which the transistors of the circuit are represented in symbolic form by black or white circles and the capacitors by black squares; the presence of a circle or a square at the intersection of a line and of a column indicates that there is a transistor (or a capacitor) at this site of the structure, this transistor or this capacitor being of course connected as will be explained with respect to FIG. 2, while noting that the connections of the transistors of a single column are all identical.

FIG. 1 indicates by OPa, OPb, OPc . . . OPj, the inputs for receiving instructions from the microprocessor; each input is constituted by a respective column conductor. These column conductors extend parallelly with respect to one another, the input columns or first parallel columns designated respectively by COL1a, COL1b, . . . COL1j are thus defined and assembled together in a group of first columns designated overall by COL1.

Each input column or first column comprises the corresponding input column and the transistors having their grid connected to this input transistor, their source connected to a constant mass potential, and their drain connected to a line conductor perpendicular to the column conductors. The transistors that form part of the group of the first columns COL1 are disposed in lines and columns; the transistors forming part of a single line have their drain connected to a single line conductor; at the intersection of a line and a column their is either a single transistor or none at all, the presence or absence of a transistor at the different intersections defining (partially) a certain operating program of the sequencer.

FIG. 1 designates by the reference LI1 the line represented in detail with all its elements; this line comprises a line conductor CL123 perpendicular to the column conductors, and transistors connected by their grid to a column conductor and by their drain to the line conductor. Here, the elements represented are a transistor T1a on a first column COL1a, transistors T1c, T1j on the first columns COL1c, COL1j but no transistor on the first column COL1b.

After having crossed the group of first columns, the line Li1 thereafter crosses a second column COL2 parallel to column COL1 and comprising a transistor T2 and a column conductor PC2. The transistor T2 has its grid connected to the conductor PC2, its drain connected to a constant potential Vcc which is the same for all the transistors placed along the length of the column 2, and furthermore having its source connected to the line conductor CL123.

To each line corresponds a respective transistor T2. It will be seen that the transistor T2 is a preload transistor (first preload transistor); it is rendered conductive by a precharge signal PCH applied to its grid through the conductor PC2.

The line conductor CL123 is also connected to a capacitor C3 connected furthermore to a potential V1.

To each line corresponds a respective capacitor C3, the capacitors C3 are placed in column in a column COL3 parallel to the columns COL1 and COL2; the potential V1 is common to the capacitors C3 of all the columns. It is in theory equal to Vcc (high power supply potential of the circuit).

It will be noted that the columns COL1, COL2, COL3 are not necessarily placed topologically in this order from left to right, and it is possible to imagine for example that the column COL2 be further to the left followed by the column COL1 then by the column COL3. Furthermore, this possibility has been represented on FIG. 2.

The line conductor CL123 is finally connected to the source of a transistor T4 that will herein-after be referred to as the first sampling transistor. To each line corresponds a respective transistor. The transistors T4 are placed along the length of a column COL4 parallel to the other columns, column that includes furthermore a column conductor connecting the grids of all the transistors of this column COL4. The first sampling transistors T4 are rendered conductive by a first sampling signal (PCH in principle).

The source of the transistor T4 is connected to the line conductor CL123 of the corresponding line; the drain of the transistor T4 is connected to a second line conductor CL56 that crosses a fifth column COL5 and a sixth column COL6.

The fifth column COL5 comprises a capacitor C5 at the intersection of each line and of this column; each capacitor C5 is connected on the one hand to the second line conductor CL56 corresponding to this line and on the other hand to a potential V2 that is the same for all the capacitors C5 of the column COL5. In theory, V2 is equal to Vss (low power supply potential of the circuit).

The sixth column comprises one or several transistors T6 corresponding to each line; a single has been represented on FIG. 1; its grid is connected to the second line conductor CL56; its source is connected to a potential Vssp which is the same for all the transistors T6 of the column COL6; its drain is connected to the input E7 of a controlled gate G7 having other inputs E1, E2, E3, E4 which are column conductors. Vssp can vary during the operating cycle of the circuit.

Attention will be paid that as from the input E7, i.e. for the seventh, eighth, nineth and tenth columns that will now be described, the general arrangement is always an arrangement of elements in lines and columns, but a line of the structure of the left hand part (columns COL1 to COL6) does not necessarily correspond to a line of the right part (columns COL7 to COL10).

The reason for this is very simple; there can be several transistors T6 at the intersection of a line and of a column COL6, and moreover the input E7 can be connected to the drains of several transistors T6 belonging to different lines. There is thus a grouping together of the lines and this is the reason why, from the input E7 and for the columns COL7 to COL10, reference will always be made to a lines and columns arrangement but the line that has been represented on FIG. 1 is called Li'1 in order to distinguish it from line Li1 (even if topologically it often happens that it is in the extension of the line Li1).

The seventh column COL7, parallel to the first six columns, comprises controlled gates G7, each gate corresponding to a respective line. These gates are controlled by input conductors in column E1 to E4 which form part of the seventh column and which are common to all the gates G7 of the column COL7. On the contrary, the input E7 in line is individual; to each line Li'1 corresponds a respective input E7 corresponding to a respective gate G7.

The gate G7 is provided with an output S7 connected to a third line conductor CL89 corresponding to the line involved Li'1 and perpendicular to the column conductors.

A capacitor C8 corresponding to the line Li'1 is connected on the one hand to a third line conductor CL89 and on the other hand to a potential V3 in theory equal to Vcc. All the capacitors C8 are placed in column in a column COL8 and the potential V3 is common to all the capacitors C8 of the column COL8.

A second preload transistor T9 corresponding to the Li'1 has its source connected to the third corresponding line CL89, its drain to a constant power supply potential Vcc, and its grid connected to a column conductor PC9 parallel to other column conductors. The transistors corresponding to the different lines are placed along the length of a column COL9 which comprises these transistors and the conductor PC9. The second preload transistors are rendered conductive by a clock signal applied to the conductor PC9, this signal being in principle the complement PCH of the first preload signal.

A second sampling transistor T10 has its source connected to a third line conductor CL89, its drain connected to a fourth line conductor CL10 corresponding to the line involved Li'1, and its grid connected to a column conductor PC10 parallel to the other column conductors. To each line Li'1 corresponds a respective transistor T10; these transistors T10 are placed along the length of a column COL10 that also comprises the conductor PC10 to which are connected the grids of these transistors; these latter can be rendered conductive upon control from a clock signal which is in principle the same as the preload signal PCH (which renders the transistors T2 conductive).

The fourth line conductor CL10 is connected to an amplification element All which can be for example an inverter (most frequently), but which can also be a NOR or NAND gate having an input connected to the fourth line conductor corresponding to the line involved and another input connected to a line conductor corresponding to another line. The amplification elements All are placed along the length of an eleventh column COL11 parallel to the others.

Finally, the output of the element All constitutes an output of the sequencer. The outputs of the elements All correspond to the other lines constitute the other outputs of the sequencer. Each output supplies respective signals which depend:

(a) upon the presence or absence of transistors T1a to T1j at the intersections of a considered line with the different columns COL1a to COL1j of the group of first columns;

(b) upon the line grouping carried out with respect to the transistors T6; it will be recalled that the input E7 can be connected to several transistors T5 corresponding to different lines;

(c) upon the control signals applied to the gate G7, and of the constitution of said gate;

(d) upon the line grouping at the input of the elements All when there are such groupings.

The operating of the circuit thus constituted will now be explained in detail.

The operating is carried out in successive cycles in principle periodic cycles. Each cycle corresponds to the carrying out of one step of an instruction (for example).

The cycle is carried out in two principal phases that correspond respectively to the activation of the clock signal PCH and to the activation of the complementary signal PCH.

During the PCH phase, the inputs OPa to OPj are reset to zero and block the transistors T1a to P1j; the transistor T2 is is rendered conductive and charges the capacitor C3. The transistor T4 is blocked.

At the end of this phase PCH, during the PCH signal, the instruction to be carried out is presented on the inputs OPa to OPj of the sequencer, the transistor T2 is blocked and the capacitor C3 is discharged if at least one of the transistors T1a to T1j is conductive and is not discharged in the contrary case. The sampling transistor T4 is furthermore rendered conductive so that the capacitor C5 takes the charge of the capacitor C3. This renders the transistor T6 conductive or leaves it blocked according to the charge taken by the capacitor C3. If several transistors T6 are connected to the same input E7, a single transistor T6 being conductive is sufficient to bring the input to the potential Vssp. It will be specified in this case that the potential Vssp is equal to Vcc (high power supply potential) during this phase PCH while it is equal to zero (mass potential) during the PCH phase.

The gate G7 acts to authorize the transmission of the logic state of the input E7 during a given cycle in the carrying out of an instruction. The inputs E1 to E4 control this opening. In the real embodiment represented, the gate G7 is constituted by several transistors in series certain of which are of the depleted type so as to be conductive whatever the signal applied to their grid (they are inactive while the gate is working) and others are of the normal type, i.e. are conductive or blocked according to the voltage level applied to their grid; the gate G7 is thus an AND gate that only opens when the controls E1 to E4, connected to the grids of these transistors, are such that all the normal transistors (non depleted) are rendered simultaneously conductive; the inputs E1 to E4 receive clock signals that define the cyclical divisions in carrying out an instruction and are active during a major part of the PCH phase and through the whole PCH phase.

During the PCH phase it should be specified that the capacitor C8 is precharged.

During the following PCH phase, the precharge of C8 ceases and the transistor T10 is rendered conductive; at the instant where the gate G7 conducts, the capacitor C8 is discharged or not into the transistor T6 according to its state, and the amplification element 11 transmits to the output the charged or discharged level of the capacitor C8. If the amplification element All is a gate grouping together several lines, it transmits at the output a state that depends upon the state of these different lines.

FIG. 2 shows the topology of the whole of the sequencer. The full black circles symbolize the transistors; these transistors are mounted in a manner such as explained with respect to each column (the mounting is not the same for example for the transistors of column 4 and those of column 6). The black squares symbolize the capacitors.

For column 7, the transistors have been represented in the form of full black circles and others in the form of hollow circles. The first are normal transistors (non depleted) and the second are depleted transistors (conductive whatever the signal applied to their grid).

This figure shows that, especially with respect to the column 6, there can have a line grouping which means that the line Li1 does not correspond to the line Li'1 even if in fact it is in the prolongation of the line Li'1; in other terms, the sequencer has an architecture of which it can be said approximately that it comprises three units arranged in lines and columns, the columns of each unit being parallel to one another and, for the major part in every case, practically in the extension of one another, with several crossed connections for line groupings, especially between column 5 and column 6 and several between columns 10 and 11.

The three units are respectively:

(a) a first unit: columns 1, 2, 3, 4, 5

(b) a second unit: columns 6, 7, 8, 9, 10

(c) a third unit: column 11.

It will be seen that each of these units is divided into sub-units (the different columns) that each have outputs that are disposed in columns one under the other and which can be easily connected to the inputs, also disposed in columns, of the following sub-unit. The units themselves can also be connected to one another easily but while taking into account of course the line crossing connections and line groupings that are directly associated to the decoding carried out by the sequencer.

This decoding varies from one microprocessor to another (the sets of instructions at the input and the controls performed by the sequencer are different) but the sequencer structure such as described is particularly well adapted to the sequencer with a new microprocessor. Furthermore, this structure is very compact.

What is claimed is:

1. An instruction sequencer for a microprocessor, said sequencer having inputs for receiving binary *sequencer* instruction signals and outputs for supplying control signals for *carrying out instructions associated with said sequencer instruction signals and* controlling operation of said microprocessor, said sequencer comprising:

[(a) sequencer inputs connected to]

*a decoding array having* input *column* conductors which are arranged in a group of first parallel columns[, each of said inputs corresponding to a respective first column of said group;

(b) wherein each of the first column of said group further comprises a plurality of decoding transistors, said decoding transistors of the group of the first parallel columns being furthermore aligned along rows perpendicular to the column direction with, each of the decoding transistor at the intersection of a given row and a given column having its gate connected to an input conductor corresponding to said column and having its drain connected to one row conductor of a first group of row conductors, each of which corresponds to a respective row of decoding transistors;

(c) wherein each of the row conductors of said first group of row conductors is connected to a respective first precharged transistors, with each of said precharged transistors having its gate controlled by a first clock signal, and further wherein each of said precharged transistors is placed along the length of a second column which is parallel to the first group of columns; and (d) further wherein each row conductor is connected to a respective first capacitor, the first capacitors being placed along a third column which is parallel to said first and second columns;

(e) further wherein each row conductor is connected to the source of respective first sampling transistors, with each of said sampling transistors having its gate controlled by a second clock signal and having its drain connected to a row conductor of a second group of row conductors perpendicular to said columns, the first sampling transistors being furthermore placed along a fourth column which is parallel to said first, second and third columns;

(f) wherein each of first sampling transistor's drain is further connected to a second respective capacitor, wherein said second capacitors being placed along a fifth column which is parallel to the first, second and third columns;

(g) wherein each row conductor of the second group of row conductors is connected to the gate of a respective transistor taken among transistors of a sixth column parallel to said first, second, and third columns, the drain of said respective transistor being connected to an input of a respective logical controlled gate, and all the sources of said transistors of said sixth column being connected to a common point;]*in said decoding array and a plurality of row conductors that are arranged in said decoding array substantially perpendicular to said first parallel columns in said decoding array, each of said input column conductors connected to a defined one of said sequencer instruction signals;*

*a plurality of decoding elements, each associated with at least a select one of said input column conductors and at least a select one of said row conductors in a predetermined decoding pattern such that the received defined sequencer instruction signal on each of said input column conductors generates one of said decoded outputs on the one of said associated row conductors associated therewith by said decoding elements in accordance with said predetermined decoding pattern; and*

[(h)] *a gate array of* logical controlled gates arranged [along a seventh column] *in rows and columns* parallel to said [first and second columns, and having an output connected first to third respective capacitors, second to a second precharged transistor, and third to a second sampling transistor, said third capacitors being placed along an eighth column, the second precharged transistors being placed along a ninth column and being controlled by a third clock signal, said second sampling transistors being placed along a tenth column and being controlled by a fourth clock signal] *decoding array, each of said gates having a conductive path and a control input that renders said associated gate conductive or non-conductive, said conductive paths for said gates in each of said rows connected in series, with said rows of said gate array having inputs at one end of said rows connected to select ones of said decoded outputs of said decoding array with the rows of said decoding array substantially in line with the rows of said gate array, the columns of said gate array each having a common conductor connected to each of the control inputs for the gates in said associated column for controlling the operation thereof to be conductive or non-conductive, select ones of said gates being permanently conductive in accordance with a predetermined gate array programming scheme that defines which of said gates are permanently conductive, the common conductors in each column operable to receive clock signals that define the cyclical divisions in carrying out an instruction and each of said rows having an output at the other end thereof for outputting the input of said decoded outputs when all of said associated gates are conductive.*

[2. An instruction sequencer according to claim 1, wherein said controlled gates have several control inputs common to all gates and each connected to a respective conductor extending parallel to the columns of the sequencer.]

* * * * *